A. VAUGHN & H. APP.
VALVE.
APPLICATION FILED JAN. 10, 1917.
1,261,326.
Patented Apr. 2, 1918.
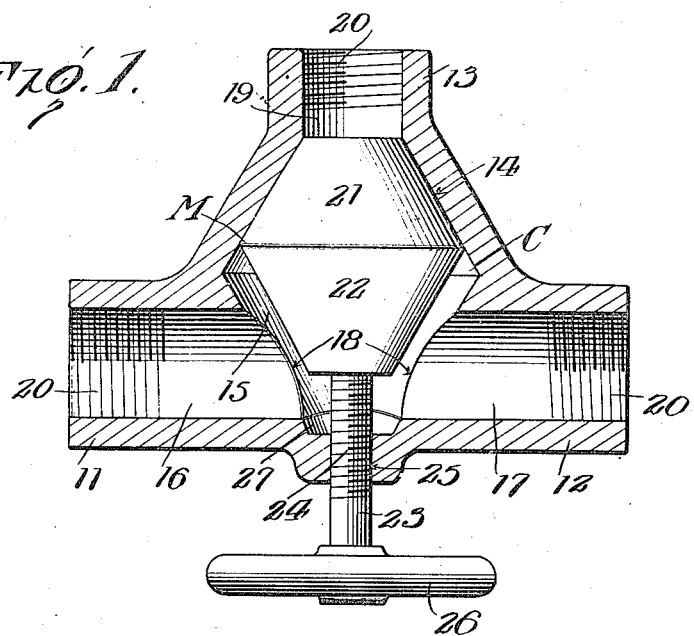
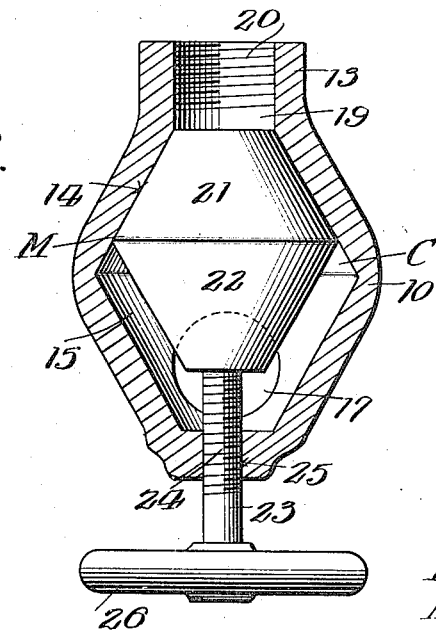
Howard App.
Arthur Vaughn,
Inventors
By Geo. T. Kimmel.
Attorney

UNITED STATES PATENT OFFICE.

ARTHUR VAUGHN AND HOWARD APP, OF ELDRED, PENNSYLVANIA.

VALVE.

1,261,326.　　　　Specification of Letters Patent.　　Patented Apr. 2, 1918.

Application filed January 10, 1917. Serial No. 141,624.

*To all whom it may concern:*

Be it known that we, ARTHUR VAUGHN and HOWARD APP, citizens of the United States, and residents of Eldred, in the county of McKean and State of Pennsylvania, have invented certain new and useful Improvements in Valves, of which the following is a specification.

The present invention relates to valves and has particular reference to a novel type of three-way valve for use in gas, water mains and the like at a joint between three or more mains to either stop the flow through all of the mains or through one of the same.

An object of our invention is to provide a valve of the class described which is simple in construction, easily manipulated, requires no packing for the valve proper and may be quickly and easily installed.

Another object of our invention is to provide a valve of the class described having a novel formation of valve chamber and closure member tending toward a simplicity of construction, and durability.

Other objects and advantages to be derived from the use of my improved three-way valve will appear from the following detailed description and the claim, taken with an inspection of the accompanying drawing, in which:

Figure 1 is a vertical sectional view of a valve embodying the improvements of our invention; and Fig. 2 is a similar view taken at right-angles to Fig. 1.

Referring more particularly to the drawing, wherein similar characters of reference designate like and corresponding parts throughout the various views, 10 designates the valve casing, the same having arms 11, 12 and 13. The casing is formed in two parts secured together by welding, or any other desired means. The valve chamber is formed by virtue of the casing 10 and is designated C, the same having frusto-conical oppositely disposed walls 14 and 15. The arms 11 and 12 are provided with ducts 16 and 17 in relative alinement communicating with the valve chamber C as indicated at 18 in Fig. 1. The arm 13 is provided with a duct 19 communicating with the valve chamber C, said ducts 16, 17 and 19 having their free ends threaded as at 20 to connect conduits thereto. The closure member is designated M and is provided with oppositely related frusto-conical faces 21 and 22.

The valve member is carried on one free end of a valve stem 23 provided with threads 24 to engage a threaded opening 25 formed in the casing 10. A valve stem manipulating wheel 26 is carried by the free end of the stem 23 for an obvious purpose. A portion of the casing 10 is recessed as at 27 to receive one end of the closure member when in position to close the ducts 16 and 17.

The use of our improved three-way valve will be readily apparent from an inspection of Fig. 1. In the position shown in Fig. 1 the valve member closes communication between the duct 19 and the ducts 16 and 17 but does not close communication between the latter. When the valve is moved to the intermediate position, that is, when the valve member is in engagement with neither of the valve seats communication is afforded between all of the ducts. To close communication between all of the ducts the valve member M is moved to engage the frusto-conical wall 15, thereby closing communication between the ducts 16 and 17 as well as between the latter and said duct 19.

From the above description taken in connection with the accompanying drawing, it is thought that a clear and comprehensive understanding of the construction, operation and advantages of our invention may be had, and while we have shown and described the device as embodying a specific structure, we desire that it be understood that such changes may be made in said structure as do not depart from the spirit and scope of the invention as claimed.

Having thus fully described our invention, what we claim as new and desire to secure by Letters Patent, is:—

In a device of the character described, the combination of a casing comprising a pair of arms extending in opposite directions and in relative alinement having ducts therein, a third arm extending laterally from the point of jointure of the first mentioned arms having a duct therein, a valve comprising a double frusto-conical opening formed at the point of jointure of the arms, the oppositely disposed walls of which provide a double valve seat, and a closure member of a configuration conforming to said opening and mounted therein adapted to at times be seated in said valve seats, said closure member adapted to permit communication between the first mentioned arms, or between all of the arms, or to cut off communication between all the arms.

In testimony whereof, we affix our signatures hereto.

ARTHUR VAUGHN.
HOWARD APP.